United States Patent
McLellan et al.

(10) Patent No.: US 9,656,174 B1
(45) Date of Patent: May 23, 2017

(54) PURCHASABLE TOURNAMENT MULTIPLIERS

(71) Applicant: KABAM, INC., San Francisco, CA (US)

(72) Inventors: Sam McLellan, San Francisco, CA (US); Luc Pieron, San Francisco, CA (US); Stephanie Schultz, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 204 days.

(21) Appl. No.: 14/548,469

(22) Filed: Nov. 20, 2014

(51) Int. Cl.
*G06F 17/00* (2006.01)
*A63F 13/792* (2014.01)
*A63F 13/35* (2014.01)
*A63F 13/46* (2014.01)

(52) U.S. Cl.
CPC ............ *A63F 13/792* (2014.09); *A63F 13/35* (2014.09); *A63F 13/46* (2014.09)

(58) Field of Classification Search
USPC ...................................................... 463/16–25
See application file for complete search history.

(56) References Cited

U.S. PATENT DOCUMENTS

| 5,816,918 A | 10/1998 | Kelly et al. .................... 463/16 |
| 5,933,813 A | 8/1999 | Teicher |
| 5,964,660 A | 10/1999 | James |

(Continued)

FOREIGN PATENT DOCUMENTS

| KR | 1020130137431 | 12/2013 |
| WO | WO 2013/059639 | 4/2013 |

(Continued)

OTHER PUBLICATIONS

PCT International Search Report and Written Opinion for PCT/US2016/017637 dated Apr. 7, 2016, 12 pages.

(Continued)

*Primary Examiner* — Ronald Laneau
(74) *Attorney, Agent, or Firm* — Sheppard Mullin Richter & Hampton LLP

(57) ABSTRACT

A system and method configured to enhance gameplay between users in an online game. In some implementations, the system and method include executing an instance of an online game and determining the value of a gameplay parameter for a user reflecting progress by that user within the online game. The system and method includes conducting an event in the online game that takes place during an event time period and determining, for individual users, values of an event parameter based on changes in the values of the gameplay parameter determined for users during the event time period and determining relative positions of users based on respective values of the event parameter and distributing awards based thereon. Users are further presented with offers to sell virtual items usable in the online game where the offers include an offer to sell virtual items, wherein the virtual items are usable by a user to enhance the value of an event parameter such that a scoring multiplier is applied to the determination of the value of the event parameter based on change in the value of the gameplay parameter subsequent to the use of the virtual item.

16 Claims, 2 Drawing Sheets

(56) References Cited

U.S. PATENT DOCUMENTS

| | | | |
|---|---|---|---|
| 6,142,472 A | 11/2000 | Kliebisch | |
| 6,190,225 B1 | 2/2001 | Coleman | |
| 6,402,619 B1 | 6/2002 | Sato | |
| 6,604,008 B2 | 8/2003 | Chudley | |
| 6,745,236 B1 | 6/2004 | Hawkins | |
| 6,850,900 B1 | 2/2005 | Hare | |
| 6,928,474 B2 | 8/2005 | Venkatesan | |
| 7,050,868 B1 | 5/2006 | Graepel | 700/93 |
| 7,076,453 B2 | 7/2006 | Jammes | |
| 7,156,733 B2 | 1/2007 | Chiang et al. | 463/1 |
| 7,192,352 B2 | 3/2007 | Walker | |
| 7,197,352 B2 | 3/2007 | Walker et al. | 463/42 |
| 7,326,115 B2 | 2/2008 | Baerlocher | 463/25 |
| 7,533,336 B2 | 5/2009 | Jaffe | |
| 7,660,740 B2 | 2/2010 | Boone | |
| 7,698,229 B2 | 4/2010 | Hsu | |
| 7,813,821 B1 | 10/2010 | Howell | 700/91 |
| 7,819,749 B1 | 10/2010 | Fish et al. | 463/42 |
| 8,016,668 B2 | 9/2011 | Hardy | |
| 8,066,571 B2 | 11/2011 | Koster et al. | 463/42 |
| 8,105,156 B2 | 1/2012 | Walker | |
| 8,147,340 B2 | 4/2012 | Brunet de Courssou et al. | 463/42 |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf et al. | 463/20 |
| 8,231,470 B2 | 7/2012 | Feeney et al. | 463/42 |
| 8,246,439 B2 | 8/2012 | Kelly et al. | 463/20 |
| 8,272,934 B2 | 9/2012 | Olive et al. | 463/16 |
| 8,272,951 B2 | 9/2012 | Ganz | 463/29 |
| 8,272,956 B2 | 9/2012 | Kelly | |
| 8,282,491 B2 | 10/2012 | Auterio | |
| 8,287,367 B2 | 10/2012 | Hall et al. | 463/29 |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker et al. | 463/25 |
| 8,317,584 B2 | 11/2012 | Aoki et al. | 463/13 |
| 8,323,110 B2 | 12/2012 | Shibamiya et al. | 463/42 |
| 8,328,642 B2 | 12/2012 | Mosites et al. | 463/42 |
| 8,332,260 B1 | 12/2012 | Mysen | |
| 8,332,544 B1 | 12/2012 | Ralls | 710/8 |
| 8,348,762 B2 | 1/2013 | Willis | 463/42 |
| 8,348,767 B2 | 1/2013 | Mahajan | |
| 8,348,768 B2 | 1/2013 | Auterio et al. | 463/42 |
| 8,360,858 B2 | 1/2013 | LaRocca | |
| 8,360,866 B2 | 1/2013 | VanLuchene | |
| 8,360,867 B2 | 1/2013 | VanLuchene | |
| 8,360,868 B2 | 1/2013 | Shvili | 463/27 |
| 8,366,544 B2 | 2/2013 | Walker | |
| 8,366,550 B2 | 2/2013 | Herrmann et al. | 463/42 |
| 8,382,572 B2 | 2/2013 | Hoffman | 463/20 |
| 8,388,427 B2 | 3/2013 | Yariv | 463/9 |
| 8,401,913 B2 | 3/2013 | Alivandi | |
| 8,408,989 B2 | 4/2013 | Bennett et al. | 463/20 |
| 8,475,262 B2 | 7/2013 | Wolf et al. | 463/20 |
| 8,506,394 B2 | 8/2013 | Kelly et al. | 463/29 |
| 8,533,076 B2 | 9/2013 | Chu | |
| 8,583,266 B2 | 11/2013 | Herbrich et al. | 700/93 |
| 8,636,591 B1* | 1/2014 | Hawk | G07F 17/3244 463/16 |
| 8,758,119 B1 | 6/2014 | BronsteinBendayan | |
| 8,777,754 B1* | 7/2014 | Santini | G07F 17/32 463/42 |
| 8,784,214 B2 | 7/2014 | Parks et al. | 463/42 |
| 8,821,260 B1 | 9/2014 | DeSanti | |
| 8,831,758 B1 | 9/2014 | Chu et al. | 700/91 |
| 8,843,557 B2 | 9/2014 | Ranade | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,007,189 B1 | 4/2015 | Curtis | |
| 9,138,639 B1 | 9/2015 | Ernst | |
| 9,256,887 B2* | 2/2016 | Santini | G07F 17/32 |
| 9,257,007 B2 | 2/2016 | Santini | |
| 9,259,642 B1 | 2/2016 | McNeill | |
| 9,286,510 B2 | 3/2016 | Soohoo | |
| 9,317,993 B2 | 4/2016 | Hardy | |
| 9,375,636 B1 | 6/2016 | Wakeford | |
| 9,403,093 B2 | 8/2016 | Harrington | |
| 9,406,201 B2 | 8/2016 | Englman | |
| 9,452,356 B1 | 9/2016 | Tsao | |
| 9,452,364 B1 | 9/2016 | Curtis | |
| 9,463,376 B1 | 10/2016 | Kim | |
| 9,468,851 B1 | 10/2016 | Pieron | |
| 2002/0023039 A1 | 2/2002 | Fritsch | |
| 2002/0059397 A1 | 5/2002 | Feola | |
| 2002/0094863 A1 | 7/2002 | Klayh | 463/21 |
| 2002/0095327 A1 | 7/2002 | Zumel | |
| 2002/0115488 A1 | 8/2002 | Berry et al. | 463/42 |
| 2002/0119824 A1 | 8/2002 | Allen | 463/42 |
| 2002/0165794 A1 | 11/2002 | Ishihara | |
| 2002/0183105 A1 | 12/2002 | Cannon et al. | 463/16 |
| 2002/0193162 A1 | 12/2002 | Walker et al. | 463/42 |
| 2003/0008713 A1 | 1/2003 | Ushiro et al. | 463/42 |
| 2003/0032476 A1 | 2/2003 | Walker | |
| 2003/0157978 A1 | 8/2003 | Englman | |
| 2003/0174178 A1 | 9/2003 | Hodges | |
| 2003/0190960 A1 | 10/2003 | Jokipii et al. | 463/42 |
| 2004/0002387 A1 | 1/2004 | Grady | |
| 2004/0068451 A1 | 4/2004 | Lenk | |
| 2004/0143852 A1 | 7/2004 | Meyers | |
| 2004/0199471 A1 | 10/2004 | Hardjono | |
| 2004/0215524 A1 | 10/2004 | Parkyn | |
| 2004/0224745 A1 | 11/2004 | Bregenzer | |
| 2004/0225387 A1 | 11/2004 | Smith, III | 700/92 |
| 2004/0267611 A1 | 12/2004 | Hoerenz | |
| 2005/0096117 A1 | 5/2005 | Katz et al. | 463/17 |
| 2005/0114223 A1 | 5/2005 | Schneider | |
| 2005/0165686 A1 | 7/2005 | Zack | |
| 2005/0255914 A1 | 11/2005 | McHale | |
| 2006/0030407 A1 | 2/2006 | Thayer | |
| 2006/0100006 A1 | 5/2006 | Mitchell | |
| 2006/0155597 A1 | 7/2006 | Gleason | |
| 2006/0200370 A1 | 9/2006 | Ratliff | |
| 2006/0217198 A1 | 9/2006 | Johnson | 463/40 |
| 2006/0287102 A1 | 12/2006 | White et al. | 463/42 |
| 2007/0021213 A1 | 1/2007 | Foe et al. | 463/42 |
| 2007/0077988 A1 | 4/2007 | Friedman | |
| 2007/0105615 A1 | 5/2007 | Lind | |
| 2007/0111770 A1 | 5/2007 | Van Luchene | 463/7 |
| 2007/0129147 A1 | 6/2007 | Gagner | 463/42 |
| 2007/0155485 A1 | 7/2007 | Cuddy | |
| 2007/0191101 A1 | 8/2007 | Coliz et al. | 463/42 |
| 2007/0191102 A1 | 8/2007 | Coliz et al. | 463/42 |
| 2007/0213116 A1 | 9/2007 | Crawford et al. | 463/16 |
| 2007/0233585 A1 | 10/2007 | Ben Simon | |
| 2007/0281285 A1 | 12/2007 | Jayaweera | |
| 2008/0004093 A1 | 1/2008 | Van Luchene | |
| 2008/0032787 A1 | 2/2008 | Low | |
| 2008/0076527 A1 | 3/2008 | Low | |
| 2008/0113815 A1 | 5/2008 | Weingardt | |
| 2008/0124353 A1 | 5/2008 | Brodeur | |
| 2008/0154798 A1 | 6/2008 | Valz | |
| 2008/0171599 A1 | 7/2008 | Salo | |
| 2008/0194318 A1 | 8/2008 | Kralicky | |
| 2008/0200260 A1 | 8/2008 | Deng | 463/42 |
| 2008/0214295 A1 | 9/2008 | Dabrowski | |
| 2008/0234043 A1 | 9/2008 | McCaskey | |
| 2008/0268946 A1 | 10/2008 | Roemer | |
| 2008/0275786 A1 | 11/2008 | Gluck | |
| 2009/0011812 A1 | 1/2009 | Katz | |
| 2009/0017886 A1 | 1/2009 | McGucken | |
| 2009/0036199 A1 | 2/2009 | Myus | |
| 2009/0048918 A1 | 2/2009 | Dawson | |
| 2009/0061982 A1 | 3/2009 | Brito | |
| 2009/0082099 A1 | 3/2009 | Luciano | |
| 2009/0204907 A1 | 8/2009 | Finn | |
| 2009/0208181 A1 | 8/2009 | Cottrell | |
| 2009/0210301 A1 | 8/2009 | Porter | |
| 2009/0234710 A1 | 9/2009 | Belgaied Hassine | |
| 2009/0315893 A1 | 12/2009 | Smith et al. | 345/473 |

(56) References Cited

U.S. PATENT DOCUMENTS

| | | |
|---|---|---|
| 2010/0022307 A1 | 1/2010 | Steuer et al. .................. 463/42 |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel ........................ 700/91 |
| 2010/0094841 A1 | 4/2010 | Bardwil |
| 2010/0099471 A1 | 4/2010 | Feeney et al. .................... 463/1 |
| 2010/0107214 A1 | 4/2010 | Ganz ............................... 726/1 |
| 2010/0113162 A1 | 5/2010 | Vemuri et al. ................ 463/42 |
| 2010/0174593 A1 | 7/2010 | Cao |
| 2010/0198653 A1 | 8/2010 | Bromenshenkel |
| 2010/0210356 A1 | 8/2010 | Losica ........................... 463/26 |
| 2010/0227682 A1 | 9/2010 | Reville |
| 2010/0228606 A1 | 9/2010 | Walker |
| 2010/0241491 A1 | 9/2010 | Eglen |
| 2010/0306015 A1 | 12/2010 | Kingston ........................ 705/8 |
| 2011/0065511 A1 | 3/2011 | Mahan ............................ 463/40 |
| 2011/0092271 A1 | 4/2011 | Nguyen |
| 2011/0092273 A1 | 4/2011 | Cerbini |
| 2011/0111841 A1 | 5/2011 | Tessmer ........................ 463/25 |
| 2011/0112662 A1 | 5/2011 | Thompson ..................... 700/91 |
| 2011/0113353 A1 | 5/2011 | Koh |
| 2011/0118002 A1 | 5/2011 | Aoki |
| 2011/0145040 A1 | 6/2011 | Zahn |
| 2011/0212756 A1 | 9/2011 | Packard |
| 2011/0218033 A1 | 9/2011 | Englman et al. ............... 463/25 |
| 2011/0227919 A1 | 9/2011 | Bongio et al. ................ 345/426 |
| 2011/0256936 A1 | 10/2011 | Walker et al. .................. 463/42 |
| 2011/0281638 A1 | 11/2011 | Bansi |
| 2011/0281654 A1 | 11/2011 | Kelly et al. .................... 463/42 |
| 2011/0282764 A1 | 11/2011 | Borst |
| 2011/0300923 A1 | 12/2011 | Van Luchene |
| 2011/0319170 A1 | 12/2011 | Shimura et al. ............... 463/42 |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman et al. ................... 463/6 |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter et al. ............. 700/92 |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0130856 A1 | 5/2012 | Petri |
| 2012/0142429 A1 | 6/2012 | Muller |
| 2012/0156668 A1 | 6/2012 | Zelin ............................. 434/362 |
| 2012/0157187 A1 | 6/2012 | Moshal ........................... 463/25 |
| 2012/0166380 A1 | 6/2012 | Sridharan |
| 2012/0166449 A1 | 6/2012 | Pitaliya ........................ 707/748 |
| 2012/0178514 A1 | 7/2012 | Schulzke ....................... 463/17 |
| 2012/0178529 A1 | 7/2012 | Collard |
| 2012/0197874 A1 | 8/2012 | Zatkin |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas et al. ................. 705/26.2 |
| 2012/0231891 A1 | 9/2012 | Watkins |
| 2012/0244947 A1 | 9/2012 | Ehrlich ......................... 463/42 |
| 2012/0244950 A1 | 9/2012 | Braun ............................ 463/42 |
| 2012/0245988 A1 | 9/2012 | Pace |
| 2012/0256377 A1 | 10/2012 | Schneider et al. ............ 273/292 |
| 2012/0282986 A1 | 11/2012 | Castro ............................ 463/1 |
| 2012/0289315 A1 | 11/2012 | Van Luchene |
| 2012/0289346 A1 | 11/2012 | Van Luchene |
| 2012/0295699 A1 | 11/2012 | Reiche |
| 2012/0296716 A1 | 11/2012 | Barbeau |
| 2012/0302335 A1 | 11/2012 | Gregory-Brown |
| 2012/0309504 A1 | 12/2012 | Isozaki |
| 2012/0311504 A1 | 12/2012 | Van Os et al. ................ 715/853 |
| 2012/0322545 A1 | 12/2012 | Arnone et al. ................. 463/25 |
| 2012/0322561 A1 | 12/2012 | Kohlhoff ........................ 463/42 |
| 2012/0329549 A1 | 12/2012 | Johnson |
| 2012/0330785 A1 | 12/2012 | Hamick |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg et al. .... 705/14.12 |
| 2013/0006736 A1 | 1/2013 | Bethke |
| 2013/0012304 A1 | 1/2013 | Cartwright |
| 2013/0013094 A1 | 1/2013 | Parks et al. ..................... 700/92 |
| 2013/0013326 A1 | 1/2013 | Miller et al. ................... 705/1.1 |
| 2013/0013459 A1 | 1/2013 | Kerr |
| 2013/0029745 A1 | 1/2013 | Kelly et al. .................... 463/19 |
| 2013/0036064 A1 | 2/2013 | Osvald |
| 2013/0090173 A1 | 4/2013 | Kislyi |
| 2013/0090750 A1 | 4/2013 | Herrman et al. ............... 700/92 |
| 2013/0123005 A1 | 5/2013 | Allen et al. ..................... 463/29 |
| 2013/0124361 A1 | 5/2013 | Bryson |
| 2013/0151342 A1 | 6/2013 | Citron et al. ............. 705/14.64 |
| 2013/0178259 A1 | 7/2013 | Strause et al. ................... 463/6 |
| 2013/0217453 A1 | 8/2013 | Briggs |
| 2013/0217489 A1 | 8/2013 | Bronstein Bendayan |
| 2013/0226733 A1 | 8/2013 | Evans |
| 2013/0237299 A1 | 9/2013 | Bancel et al. .................... 463/9 |
| 2013/0244767 A1 | 9/2013 | Barclay |
| 2013/0288757 A1 | 10/2013 | Guthridge |
| 2013/0288787 A1 | 10/2013 | Yoshie |
| 2013/0303276 A1 | 11/2013 | Weston |
| 2013/0303726 A1 | 11/2013 | Mozzarelli |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1 | 12/2013 | Adams |
| 2014/0004884 A1 | 1/2014 | Chang |
| 2014/0011565 A1 | 1/2014 | Elias |
| 2014/0018156 A1 | 1/2014 | Rizzotti et al. ................ 463/25 |
| 2014/0033262 A1 | 1/2014 | Anders |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0157314 A1 | 6/2014 | Roberts |
| 2014/0180725 A1 | 6/2014 | Ton-That et al. |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1* | 11/2014 | Santini ............... G07F 17/3244 463/25 |
| 2014/0337259 A1 | 11/2014 | Lamb |
| 2015/0019349 A1 | 1/2015 | Milley |
| 2015/0065241 A1* | 3/2015 | McCarthy .......... G07F 17/3262 463/31 |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |
| 2016/0121219 A1 | 5/2016 | Kim |
| 2016/0236094 A1 | 8/2016 | Pieron |

FOREIGN PATENT DOCUMENTS

| | | |
|---|---|---|
| WO | 2015013373 | 1/2015 |
| WO | 2015153010 | 10/2015 |

(56) References Cited

FOREIGN PATENT DOCUMENTS

| WO | 2015168187 | 11/2015 |
|---|---|---|
| WO | 2015179450 | 11/2015 |
| WO | 2015196105 | 12/2015 |

OTHER PUBLICATIONS

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Behavioural Analytics & Campaigning", http://lotaris.com/behavioural._analytics_and._Campaigning.htm, screenshot access date May 24, 2012 2:21 PM, 1 page.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

TFWiki "Teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online"', available on Sep. 9, 2011, https://web.archive.org/web/20110927210155/http://en.wikipedia.org/wiki/Gaia_Online, 8 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

Ozeagle, "What happens if . . . answers about account types" on Lotro forum, Jan, 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php ?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

New Feature: Tiered Tournaments and Tournament Updates, printed from http://community.kabam.com/forums/showthread.php?171349-New-Feat on Feb. 11, 2014, 2 pages.

'Quest item—WoWWiki—Your guide to the World of Warcraft', printed from http://www.wowwiki.com/Quest_Item, Retrieved on Apr. 16, 2014, 1 page.

"A Wondrous Drop Event and Double EXP", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_Drop_Event_and_Double_EXP>. 2 pages.

"Flyff", [dated May 25, 2013]. From Wikipedia, The Free Encylopedia. [on line], [retrieved on Jan. 12, 2016). Retrieved from the Internet<URL:https://en.wikipedia.org/w/index.php?title=Flyff&oldid=556751091 >. 4 pages.

"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll of_Amplification_R>. 3 pages.

Elsword—Wikipedia, the free encyclopedia, URL: en.wikipedia.org/wiki/Elsword [Retrieved Feb. 21, 2013], 6 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

Wikipedia, Mafia Wars, <http://en.wikipedia.org/wiki/Mafia_Wars>, Jan. 28, 2012, 3 pages.

* cited by examiner

PURCHASABLE TOURNAMENT MULTIPLIERS

FIELD OF THE DISCLOSURE

This disclosure relates to providing enhanced interest in game play particularly with respect to online tournaments wherein players can purchase the benefit of enhancing the scoring they would otherwise achieve through the use of a scoring multiplier.

BACKGROUND

Players can compete against each other in many online games in both tournament and non-tournament play. Tournaments often track an aspect of the game and rank the resulting metric achieved by a player as against other players. For example, a tournament of might may measure all the might accumulated by a player against the total might accumulated by other players on that realm.

Once a tournament has begun, it can often be a challenge to get some players to engage as the threshold for placing in the top tiers is so far away. For example, if a player is interested in joining a tournament sometime after it has begun and the tournament leader and others have a high score values which are perhaps unattainable and/or appear to be unattainable, that player may not want to participate in the tournament as they feel that the players already involved in the tournament are so far ahead that they will not be able to catch up. In addition, players already participating in a tournament that fall significantly behind leaders in terms of scoring may lose interest in the tournament and/or quit the tournament. In either of these cases, revenue opportunities as the game progresses may be lessened or lost entirely and, from a player perspective, tournaments can become less interesting to players that feel they don't have a chance to compete for one of the top scoring spots.

SUMMARY

One aspect of the disclosure relates to a system and method configured to enhance gameplay between users in an online game. In some implementations, the system and method include executing an instance of an online game, and using the instance of the online game to facilitate participation by the users in the online game via a client computing devices. Facilitating participation in the online game includes facilitating interaction between game entities associated with and/or controlled by the individual users in the online game as well as interaction within the gaming environment. In some implementations, the value of a gameplay parameter for a user reflecting progress by that user within the online game is determined.

The system and method includes conducting an event in the online game that takes place during an event time period. In some implementations, this may include determining, for individual users, values of an event parameter based on changes in the values of the gameplay parameter determined for users during the event time period and determining relative positions of users based on respective values of the event parameter.

In some implementations, the system and method may include the distribution of awards to users subsequent to the event based on the relative positions of the users at the end of the event time period wherein the awards include virtual items usable in the online game. The system and method of the present invention may include presenting offers to sell virtual items usable in the online game to users where the offers include an offer to sell virtual items, wherein the virtual items are usable by a user to enhance the value of an event parameter such that a scoring multiplier is applied to the determination of the value of the event parameter based on change in the value of the gameplay parameter subsequent to the use of the virtual item.

In exemplary implementations, enhancing gameplay between users associated with an online game may be performed by processors executing computer program components. In some implementations, the system may include one or more servers. The server(s) may be configured to communicate with one or more client computing platforms according to a client/server architecture. The users may access the system via the client computing platforms, for instance, to engage in game play and/or participate in events such as tournaments.

The server(s) may be configured to execute one or more computer program components to provide one or more games to users (or players). The computer program components may include one or more of a game component, a gameplay parameter component, an event execution component, an event award component, a shop component and/or other components. It is noted that the client computing platforms may include one or more computer program components that are the same as or similar to the computer program components of the server(s) to facilitate individualized content made available to the users of online games.

The game component may be configured to execute an instance of an online game, and to use the instance of the online game to facilitate participation by users in the online game via client computing devices wherein the online game facilitates interactions between game entities associated with and/or controlled by the individual users in the online game and/or interactions between game entities and the gaming environment.

The gameplay parameter component may be configured to determine, for the individual users, values of a gameplay parameter that reflects progress within the online game such that a first value of the gameplay parameter is determined for the first user and reflects progress of the first user within the online game.

The event execution component may be configured to conduct an event in the online game that takes place during an event time period wherein conducting the event includes determining, for the individual users, values of an event parameter based on changes in the values of the gameplay parameter determined for the users during the event time period such that a first value of the event parameter is determined for the first user based on change in the first value of the gameplay parameter during the event time period and determining relative positions of the users based on the values of the event parameter.

The event award component may be configured to distribute awards to the users subsequent to the event based on the relative positions of the users at the end of the event time period, the awards including virtual items usable in the online game.

The shop component may be configured to effectuate presentation to the users of offers to sell virtual items usable in the online game to the users, the offers including a first offer to sell a first virtual item, wherein the first virtual item is usable by the first user to enhance the first value of the event parameter such that a scoring multiplier is applied to the determination of the first value of the event parameter based on change in the first value of the gameplay parameter subsequent to use of the first virtual item.

One aspect of the disclosure relates to a computer-implemented method for enhancing gameplay between users in connection with online games, the method being implemented in a computer system that includes one or more physical processors and storage media storing machine-readable instructions. The method may be implemented in a computer system that includes one or more physical processors and storage media storing machine-readable instructions. The method includes executing an instance of an online game. The method further includes implementing the instance of the online game to facilitate participation of the user in the online game. The method further includes determining, for the individual users, values of a gameplay parameter that reflects progress within the online game such that a first value of the gameplay parameter is determined for the first user and reflects progress of the first user within the online game.

In some implementations, the method includes conducting an event in the online game that takes place during an event time period, wherein conducting the event includes determining, for the individual users, values of an event parameter based on changes in the values of the gameplay parameter determined for the users during the event time period such that a first value of the event parameter is determined for the first user based on change in the first value of the gameplay parameter during the event time period and determining relative positions of the users based on the values of the event parameter.

The method of the present invention may also include distributing awards to the users subsequent to the event based on the relative positions of the users at the end of the event time period, the awards including virtual items usable in the online game and presenting offers to sell virtual items usable in the online game to the users, the offers including a first offer to sell a first virtual item, wherein the first virtual item is usable by the first user to enhance the first value of the event parameter such that a scoring multiplier is applied to the determination of the first value of the event parameter based on change in the first value of the gameplay parameter subsequent to use of the first virtual item.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
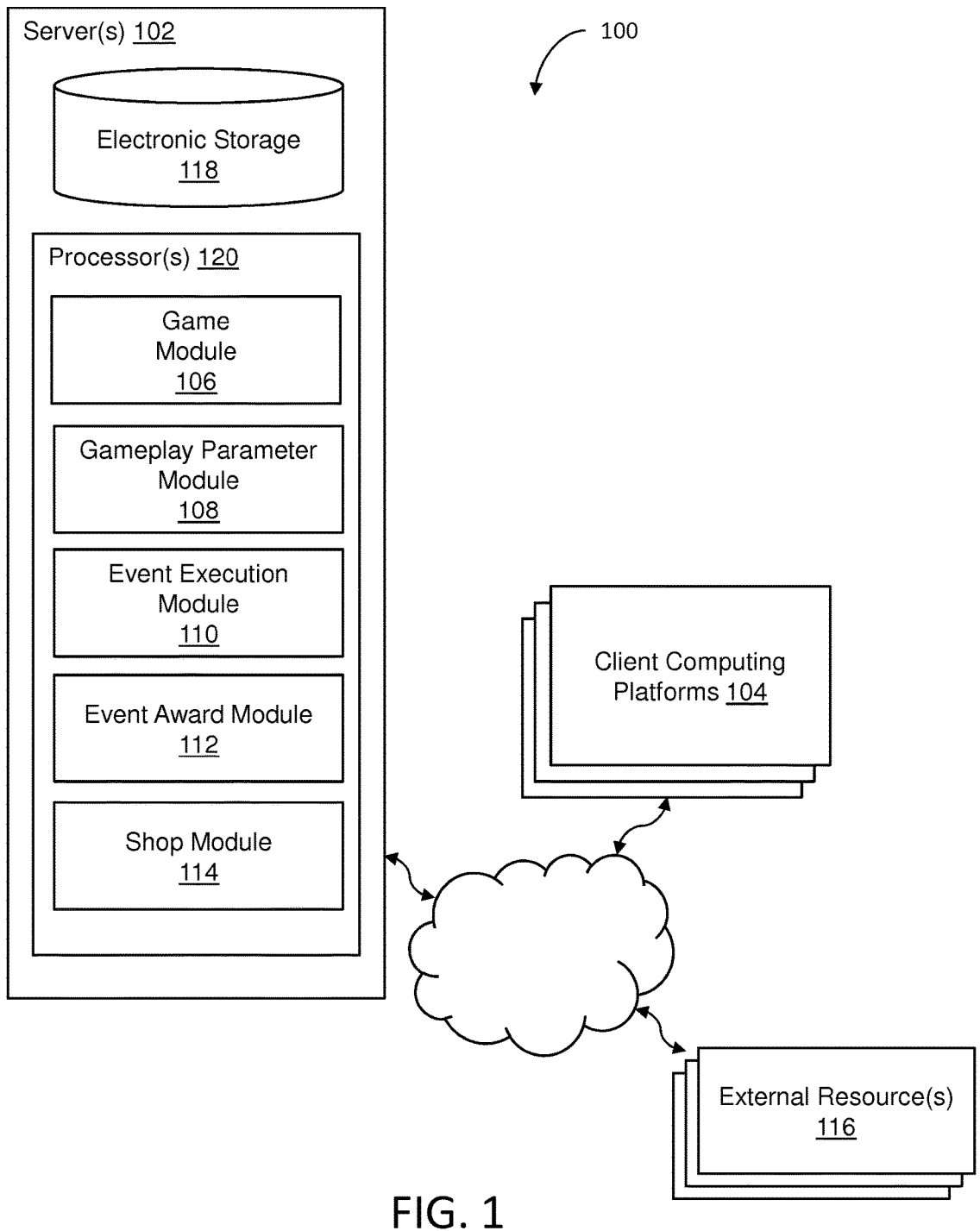
FIG. 1 illustrates a system configured to provide a virtual space, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, a system and methodology is provided which enhances the online gaming experience particularly with respect to tournaments and other competitions between and among player of online games. Accordingly, embodiments may be configured such that this system tracks individual player scores within tournaments, which such scores may be determinative of an event score which is used to rank players as against each other during the time period of the tournament or other event.

Embodiments may be configured such that multipliers which impact the event score associated with each player can be purchased by players. When purchased, these multipliers may cause the purchasing player's event score and/or incremental increases to the event score over time to be a multiple of what it otherwise would be without the multiplier having been purchased. This, in turn will give the purchasing player an advantage in ranking for the event as against other players in respect of achieving a higher event score than otherwise would have been achieved, providing the player with a higher ranking.

According to the present invention, the multipliers available may be customized in many different ways. For example, the multipliers may apply only to a subset of in-game activities such as training troops and/or constructing a city whereas the multiplier is not applied to other in-game activities that add to a player's gameplay score. Similarly, the multiplier may be limited to specific game activities associated with gameplay scoring, which such activities are "high-value" activities such as only a subset of troop training activities wherein the troops are "high-tier" troops or only a subset of city building activities wherein the cities are "high-value" cities. As another example, the multiplier may specifically impact only the training of high tier troops that require a consumable to train while not applying to scoring tied to the training of other troops. These decisions on customization of multipliers can be implemented so as to incentivize and de-incentivize player behavior as may be desired.

According to the present invention, the system and methodology may permit a player purchasing a multiplier to select from among a universe of available applications for the scoring boost. For example, multipliers may be available for selection such as a training might multiplier which applies to training activities only and/or for a building might multiplier which only applies to building activities within the game.

The multiplier could also be adapted to where it applied to the players in-game might and is not limited to tournament gained scoring. A player could purchase a virtual item that acts as a temporary boost to a players might. All might gained while the buff was active would be increased by a set amount over the normal might gained.

In some embodiments, multipliers may be customized such that their effect is on a "sliding scale" basis. In other words, the multiplier may have a larger effect when the player's event score is distant from the event/tournament leaders but as the player catches up via an event score that is relatively closer to the leaders, the effect of the multiplier is lessened. In some embodiments, at some point, the multiplier may have no further effect once the purchasing player attains a score which is within some predefined close distance to one or more of the tournament/event leaders.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program components. The computer program components may include one or more of a game component 106, a gameplay parameter component 108, an event execution component 110, an event award component 112, a shop component 114 and/or other components. As noted, the client computing platform(s) 104 may include one or more computer program components that are the same as or similar to the computer program components of the server(s) 102 to facilitate in-game actions.

The game component 106 may be configured to execute an instance of a game to facilitate presentation of the game to users. The game component 106 may be configured to implement in-game actions in the instance of the game, in response to action requests for the in-game actions by the users.

The game may be provided via a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102. In implementations, the game component 106 may also be configured to implement the delivery of promotional avatars to qualified player in connection with in-game implementation as described herein.

The instance of the online game may be persistent. That is, the online game may continue on whether or not individual users are currently logged in and/or participating in the online game. A user that logs out of the online game and then logs back in some time later may find the virtual space associated with the online game has been changed through the interactions of other users with the virtual space during the time the user was logged out. These changes may include changes to the simulated physical space, changes in the user's inventory, changes in other users' inventories, changes experienced by non-user characters, and/or other changes.

The gameplay parameter component 108 may be configured to determine, for individual users, values of a gameplay parameter that reflects progress within the online game. The determined gameplay parameter may be implemented as a scoring value ascribed to a player in respect of in-game activities undertaken and/or achieved by the player in the online game. For example, gameplay parameter component 108 may award scoring value to a player as a result of a player training troops in game and/or building items such as cities and/or other virtual objects within the game.

Event execution component 110 may be configured to conduct an event associated with an online game that takes place during an event time period. An event may be, for example, a tournament involving a group of players which compete to attain high scores as a result of in-game activities as described above. According to some embodiments, event execution component 110 may determine, for players, values of an event parameter based on changes in the values of the gameplay parameter determined for the players during the event time period. In some embodiments, event execution component 110 may also determine relative positions of players as against one another in competition based on the respective values of the event parameters ascribed to each of the players.

Event award component 112 may be configured to distribute awards to players subsequent to the event based on the relative positions of the players at the end of the event time period. In some implementations, the awards may include virtual items usable in the online game, usable in other online games and/or usable outside of online games. According to preferred embodiment, these virtual items may be stored in an account of the player and be available for usage and/or transfer to other accounts as directed by the player. In some embodiments, awards may be based on relative standings of the players at the conclusion of the event/tournament and/or other tasks, goals and/or achievements attained by the player during tournament play.

Shop component 114 may be configured to effectuate presentation to the players of offers to sell virtual items to the players. These virtual items may be usable in one or more online games and/or have value outside of online gaming. In some embodiments, the offers include an offer to sell a virtual item which is usable by a player to enhance the value of an event parameter associated with a player using the virtual item. In this case, the virtual item may be a tournament multiplier which can be used to apply a scoring multiplier to the determination of an event parameter for a player based on changes to the gameplay parameter associated with that player. As such and in accordance with the present invention, a player's event score for purposes of ranking as against other players involved in the event/tournament may be higher than it otherwise would be without the purchase and use of the tournament multiplier.

According to some embodiments, the tournament multiplier may be customized such that it applies only to a subset of in-game activities as described above such as only to troop training activities or a subset thereof and/or to building activities and/or a subset thereof. In some implementations, the multiplier may have a lessened effect on the determination of the event score based on the gameplay score as the event score converges to one or more of the scores for tournament leaders. In some embodiments, at some point, when the event score for the purchasing player exceeds some threshold for closeness to one or more tournament leaders, the multiplier may have no further effect.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removeable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute components 106, 108, 110, 112 and 114. Processor 120 may be configured to execute components 106, 108, 110, 112 and 114 by software; hardware; firmware; some combination of software, hardware, and/or firmware; and/or other mechanisms for configuring processing capabilities on processor 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 112 and 114 are illustrated in FIG. 1 as being implemented within a single processing unit, in implementations in which processor 120 includes multiple processing units, one or more of components 106, 108, 110, 112 and 114 may be implemented remotely from the other components. The description of the functionality provided by the different components 106, 108, 110, 112 and 114 described above is for illustrative purposes, and is not intended to be limiting, as any of components 106, 108, 110, 112 and 114 may provide more or less functionality than is described. For example, one or more of components 106, 108, 110, 112 and 114 may be eliminated, and some or all of its functionality may be provided by other ones of components 106, 108, 110, 112 and 114. As another example, processor 120 may be configured to execute one or more additional components that may perform some or all of the functionality attributed below to one of components 106, 108, 110, 112 and 114.

Figure 2:
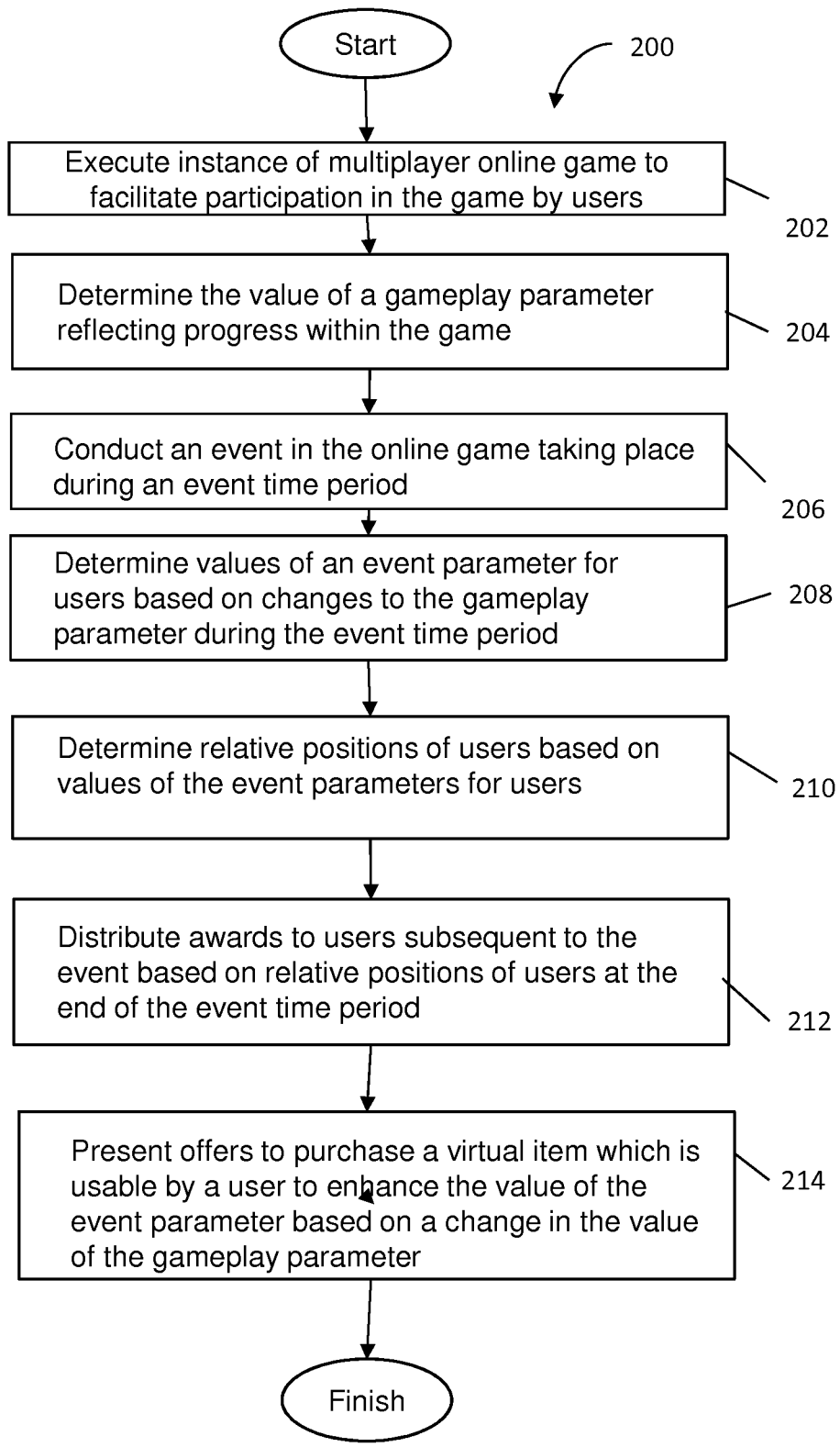
FIG. 2 illustrates a method of hosting a virtual space to client computing devices for interaction by users, including providing enhanced gameplay via the provision of purchasable tournament multipliers.

FIG. 2 illustrates a method for promoting enhanced gameplay between users in a virtual space, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate participation in the game by users. Operation 202 may be performed by a game component that is the same as or similar to game component 106, in accordance with one or more implementations.

At an operation 204, a gameplay parameter is determined for a player within the game reflecting that player's progress within the game. The progress as reflected by the gameplay parameter may be reflective of achievements within game such as the training of troops and/or the building of cities within the virtual game environment. Operation 204 may be performed by a gameplay parameter component that is the same as or similar to gameplay parameter component 108, in accordance with one or more implementations.

At an operation 206, an event is conducted in connection with the online game wherein the event takes place within a predetermined event time period. The event may be a tournament or some other competition between and among players of the online game. Operation 206 may be performed by an event execution component that is the same as or similar to event execution component 110, in accordance with one or more implementations.

At operation 208, values of an event parameter associated with each of the players is determined. This value is determined based on changes to the gameplay parameter determined for each of the players during the event time period. Operation 208 may be performed by an event execution component that is the same as or similar to event execution component 110, in accordance with one or more implementations.

At an operation 210, the relative positions of players based on values of their respective event parameters is determined. This reflects the player's current standing in the tournament or other event as against other players that are participating. Operation 210 may be performed by an event execution component that is the same as or similar to event execution component 110, in accordance with one or more implementations.

At an operation 212, awards are distributed to players subsequent to the event based on the relative positions of the players at the end of the event. Various award scenarios are possible such as an award only to the top player or awards to a plurality of players that are leaders in scoring and/or have attained other achievements in connection with online game play. In some embodiments, awards comprise virtual goods that are usable within the online game. Operation 212 may be performed by an event award component that is the same as or similar to event award component 112, in accordance with one or more implementations.

At an operation 214, offers are presented to players through which they may purchase a virtual item which is usable by the player to enhance the value of the event parameter ascribed to the player based on a change in the value of the gameplay parameter ascribed to the player and beyond what would have been achieved without the purchase of the virtual good. In some embodiments, this virtual good represents a tournament multiplier which is applied to generate an enhanced event parameter based on a gameplay parameter determined for that player. Operation 214 may be performed by a shop component that is the same as or similar to shop component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for promoting enhanced gameplay between users in a virtual space, the system comprising:
   one or more physical computer processors configured by non-transitory machine-readable instructions to:
   execute an instance of an online game, and to use the instance of the online game to facilitate participation by users in the online game via client computing devices wherein the online game facilitates interaction between game entities associated with and/or controlled by the individual users in the online game and/or interaction between game entities and the online game environment;

determine, for the individual users, values of a gameplay parameter that reflects progress within the online game such that a first value of the gameplay parameter is determined for the first user and reflects progress of the first user within the online game;

conduct an event in the online game that takes place during an event time period, wherein conducting the event includes:

determining, for the individual users, values of an event parameter based on changes in the values of the gameplay parameter determined for the users during the event time period such that a first value of the event parameter is determined for the first user based on change in the first value of the gameplay parameter during the event time period; and determining relative positions of the users based on the values of the event parameter;

distribute awards to the users subsequent to the event based on the relative positions of the users at the end of the event time period, the awards including virtual items usable in the online game; and effectuate presentation to the users of offers to sell virtual items usable in the online game to the users, the offers including a first offer to sell a first virtual item, wherein the first virtual item is usable by the first user to enhance the first value of the event parameter such that a scoring multiplier is applied to the determination of the first value of the event parameter based on change in the first value of the gameplay parameter subsequent to use of the first virtual item.

2. The system of claim 1 wherein said online game is implemented in connection with non-tournament gameplay.

3. The system of claim 1 wherein said scoring multiplier comprises a multiplier applying only to changes in the first value of the gameplay parameter caused by a specific subset of events that result in changes in the first value of the gameplay parameter.

4. The system of claim 3 wherein said specific subset of events comprise training of a subset of troops that can be trained by the first user in the online game.

5. The system of claim 1 wherein said gameplay parameter comprises one or more of might, valor, reputation, or experience points.

6. The system of claim 1 wherein said scoring multiplier comprises a temporal multiplier applying to scores achieved only during a limited period of gameplay.

7. The system of claim 1 wherein said scoring multiplier comprises a multiplier which applies varying multiples dependent upon said relative positions of said users.

8. The system of claim 7 wherein said applied multiple decreases as the value of said event parameter for said first user's position converges to the value of an event parameter for a leading user.

9. A method of promoting enhanced gameplay between users in a virtual space, the method being implemented by one or more physical computer processors configured by non-transitory machine-readable instructions, the method comprising:

executing an instance of an online game, and using the instance of the online game to facilitate participation by users in the online game via client computing devices wherein the online game facilitates interactions between game entities associated with and/or controlled by the individual users in the online game and/or interaction between game entities and the online game environment;

determining, for the individual users, values of a gameplay parameter that reflects progress within the online game such that a first value of the gameplay parameter is determined for the first user and reflects progress of the first user within the online game;

conducting an event in the online game that takes place during an event time period, wherein conducting the event includes:

determining, for the individual users, values of an event parameter based on changes in the values of the gameplay parameter determined for the users during the event time period such that a first value of the event parameter is determined for the first user based on change in the first value of the gameplay parameter during the event time period;

determining relative positions of the users based on the values of the event parameter;

distributing awards to the users subsequent to the event based on the relative positions of the users at the end of the event time period, the awards including virtual items usable in the online game; and presenting offers to sell virtual items usable in the online game to the users, the offers including a first offer to sell a first virtual item, wherein the first virtual item is usable by the first user to enhance the first value of the event parameter such that a scoring multiplier is applied to the determination of the first value of the event parameter based on change in the first value of the gameplay parameter subsequent to use of the first virtual item.

10. The method of claim 9 wherein said online game is implemented in connection with non-tournament gameplay.

11. The method of claim 10 wherein said scoring multiplier comprises a multiplier applying only to changes in the first value of the gameplay parameter caused by a specific subset of events that result in changes in the first value of the gameplay parameter.

12. The method of claim 11 wherein said specific subset of events comprise training of a subset of troops that can be trained by the first user in the online game.

13. The method of claim 9 wherein said gameplay parameter comprises one or more of might, valor, reputation, or experience points.

14. The method of claim 9 wherein said scoring multiplier comprises a temporal multiplier applying to scores achieved only during a limited period of gameplay.

15. The method of claim 9 wherein said scoring multiplier comprises a multiplier which applies varying multiples dependent upon said relative positions of said users.

16. The method of claim 15 wherein said applied multiple decreases as the value of said event parameter for said first user's position converges to the value of an event parameter for a leading user.

* * * * *